(12) United States Patent
Cao et al.

(10) Patent No.: US 11,420,829 B2
(45) Date of Patent: Aug. 23, 2022

(54) DEVICE AND METHOD FOR TRANSFERRING COMPONENTS

(71) Applicants: Tyco Electronics (Shanghai) Co. Ltd., Shanghai (CN); TE Connectivity Services GmbH, Schaffhausen (CH)

(72) Inventors: Jian Cao, Shanghai (CN); Lvhai Hu, Shanghai (CN); Fengchun Xie, Shanghai (CN); Yun Liu, Shanghai (CN); An Yang, Shanghai (CN); Yingcong Deng, Shanghai (CN); Roberto Francisco-Yi Lu, Bellevue, WA (US)

(73) Assignees: TE Connectivity Services GmbH, Schaffhausen (CH); Tyco Electronics (Shanghai) Co. Ltd., Shanghai (CN)

( * ) Notice: Subject to any disclaimer, the term of this patent is extended or adjusted under 35 U.S.C. 154(b) by 387 days.

(21) Appl. No.: 16/774,694

(22) Filed: Jan. 28, 2020

(65) Prior Publication Data
US 2020/0247620 A1 Aug. 6, 2020

(30) Foreign Application Priority Data
Jan. 31, 2019 (CN) .......................... 201910099103.0

(51) Int. Cl.
*B65G 47/90* (2006.01)
*H01R 43/20* (2006.01)
(Continued)

(52) U.S. Cl.
CPC ............ *B65G 47/90* (2013.01); *B25J 9/1687* (2013.01); *B25J 19/02* (2013.01); *H01R 43/20* (2013.01); *Y10T 29/49208* (2015.01)

(58) Field of Classification Search
CPC ........ B65G 47/90; B65G 25/08; B65G 35/00; B65G 43/08; B25J 9/1687; B25J 19/02; H01R 43/20; Y10T 29/49208
(Continued)

(56) References Cited

U.S. PATENT DOCUMENTS 4,879,862 A * 11/1989 Nolte ..................... B65B 25/141
  53/247
5,008,999 A * 4/1991 Correll, Jr .............. H01R 43/20
  29/33 M
(Continued)

FOREIGN PATENT DOCUMENTS

CN 112009959 A * 12/2020
CN 112722854 A * 4/2021
(Continued)

*Primary Examiner* — B M M Hannan
(74) *Attorney, Agent, or Firm* — Barley Snyder (57) ABSTRACT

A device for transferring components includes a transfer assembly and a drive assembly. The transfer assembly has a transfer track transferring a plurality of components therein. The transfer track has an operation position for operating the components. The drive assembly has a first drive mechanism transferring a first set of components of the components at the operation position in the transfer track and a second drive mechanism transferring a second set of components of the components at the operation position in the transfer track. The first drive mechanism and the second drive mechanism in turn drive the first set of components and the second set of components, continuously transferring the components.

20 Claims, 5 Drawing Sheets

(51) Int. Cl.
  *B25J 19/02* (2006.01)
  *B25J 9/16* (2006.01)
(58) Field of Classification Search
  USPC .......................................................... 29/876
  See application file for complete search history.

(56) References Cited

U.S. PATENT DOCUMENTS

| | | | | |
|---|---|---|---|---|
| 5,159,393 | A | * | 10/1992 | Hiroshima ........... G03G 15/167 |
| | | | | 399/318 |
| 5,350,564 | A | * | 9/1994 | Mazza ................ B01L 3/50855 |
| | | | | 422/65 |
| 6,360,421 | B1 | * | 3/2002 | Oatridge ................ B62D 65/02 |
| | | | | 29/469 |
| 7,320,562 | B1 | * | 1/2008 | Gromley ................ B65G 51/32 |
| | | | | 406/176 |
| 9,259,794 | B2 | * | 2/2016 | Lee ..................... B23K 1/0016 |
| 2005/0129301 | A1 | * | 6/2005 | Kanno .................... G01R 31/01 |
| | | | | 382/145 |
| 2007/0062446 | A1 | * | 3/2007 | Iijima ................ H01L 21/6732 |
| | | | | 118/232 |
| 2009/0041562 | A1 | * | 2/2009 | Kobayashi ............ B23P 19/007 |
| | | | | 414/17 |
| 2011/0289772 | A1 | * | 12/2011 | Kosaka .................... H01L 24/75 |
| | | | | 29/832 |
| 2012/0066891 | A1 | * | 3/2012 | Lin ........................ H01R 43/20 |
| | | | | 29/33 M |
| 2017/0142875 | A1 | * | 5/2017 | Iisaka ................ H05K 13/0853 |
| 2018/0064006 | A1 | * | 3/2018 | Takahashi .............. H05K 13/02 |
| 2018/0177088 | A1 | * | 6/2018 | Goto ................... H05K 13/0853 |
| 2020/0159188 | A1 | * | 5/2020 | He ........................ B25J 9/0003 |
| 2020/0238335 | A1 | * | 7/2020 | Viverge .................... B07B 1/36 |

FOREIGN PATENT DOCUMENTS

| | | | | |
|---|---|---|---|---|
| CN | | 112743513 A | * 5/2021 | |
| WO | WO-2020224288 A1 | * 11/2020 | ............ B65G 35/00 |

* cited by examiner

DEVICE AND METHOD FOR TRANSFERRING COMPONENTS

CROSS-REFERENCE TO RELATED APPLICATION

This application claims the benefit of the filing date under 35 U.S.C. § 119(a)-(d) of Chinese Patent Application No. 201910099103.0, filed on Jan. 31, 2019.

FIELD OF THE INVENTION

The present invention relates to a device for transferring components and, more particularly, to a device for transferring components including a pair of drive mechanisms.

BACKGROUND

An air cylinder is generally used to transfer a housing so as to insert a terminal into the housing, thereby assembling an electrical connector. Such a process is only carried out on one housing at every turn, that is, the terminal is inserted into only one housing during each process. Therefore, if such a process is used to transfer the housing to assemble the electrical connector, an assembly speed may not meet production requirements. Moreover, a positioning precision for the housing in the process is not high enough to meet quality requirements of the electrical connector, thereby adversely affecting a yield rate of insertion. For some simple automated processes, the housing is transferred by a servo module. However, this manner is not adapted to transferring a plurality of housings, thereby also adversely affecting the yield rate of insertion.

SUMMARY

A device for transferring components includes a transfer assembly and a drive assembly. The transfer assembly has a transfer track transferring a plurality of components therein. The transfer track has an operation position for operating the components. The drive assembly has a first drive mechanism transferring a first set of components of the components at the operation position in the transfer track and a second drive mechanism transferring a second set of components of the components at the operation position in the transfer track. The first drive mechanism and the second drive mechanism in turn drive the first set of components and the second set of components, continuously transferring the components.

BRIEF DESCRIPTION OF THE DRAWINGS

The invention will now be described by way of example with reference to the accompanying Figures, of which.

DETAILED DESCRIPTION OF THE EMBODIMENT(S)

The technical solution of the present disclosure will be described hereinafter in further detail with reference to the following embodiments, taken in conjunction with the accompanying drawings. In the specification, the same or similar reference numerals indicate the same or similar parts. The description of the embodiments of the present disclosure hereinafter with reference to the accompanying drawings is intended to explain the general inventive concept of the present disclosure, and should not be constructed as a limitation to the present disclosure. In addition, in the following detailed description, for the sake of explanation, numerous specific details are set forth in order to provide a thorough understanding of the disclosed embodiments. It will be apparent, however, one or more embodiments may also be practiced without these specific details. In other instances, well-known structures and devices are illustrated schematically in order to simplify the drawing.

Figure 1:
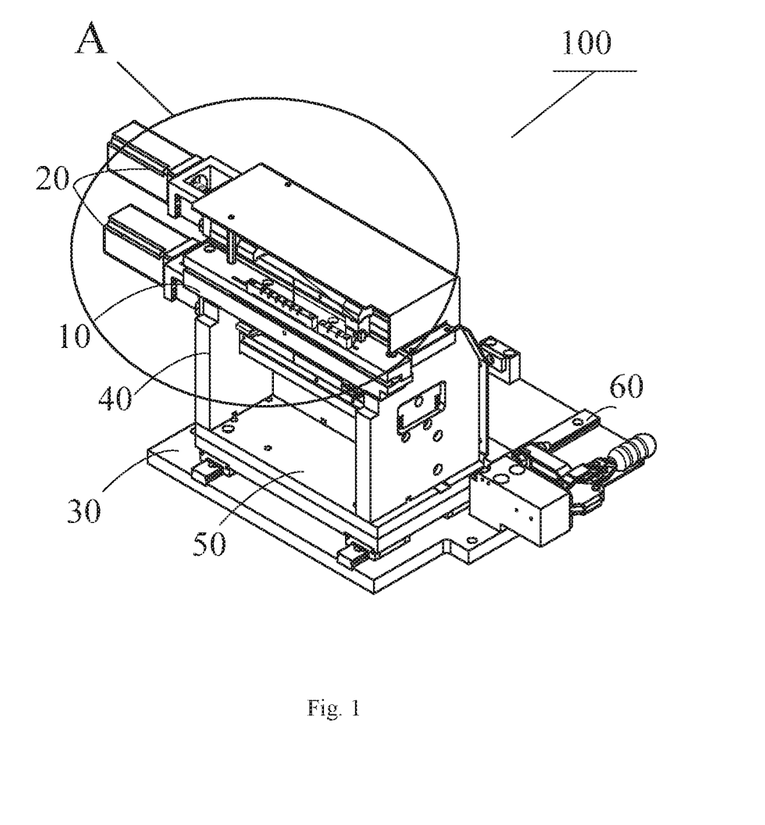
FIG. 1 is a perspective view of a device for transferring components according to an embodiment.
Figure 2:
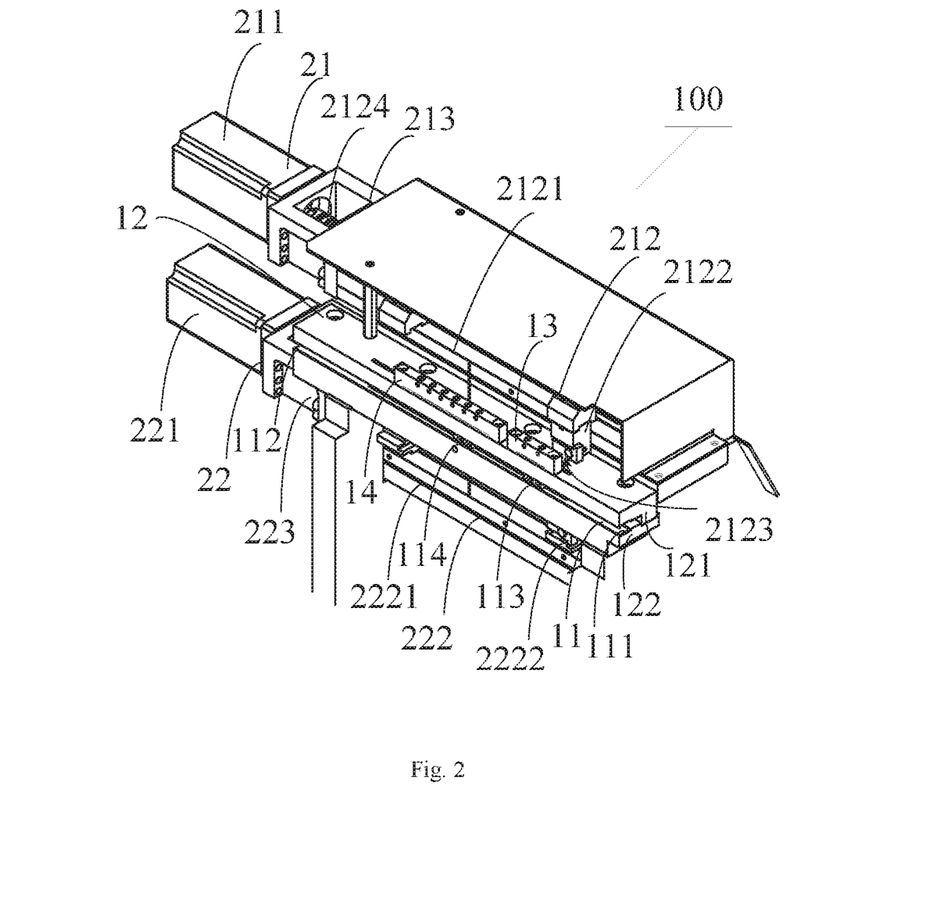
FIG. 2 is an enlarged view of a portion A of the device of FIG. 1.
Figure 3:
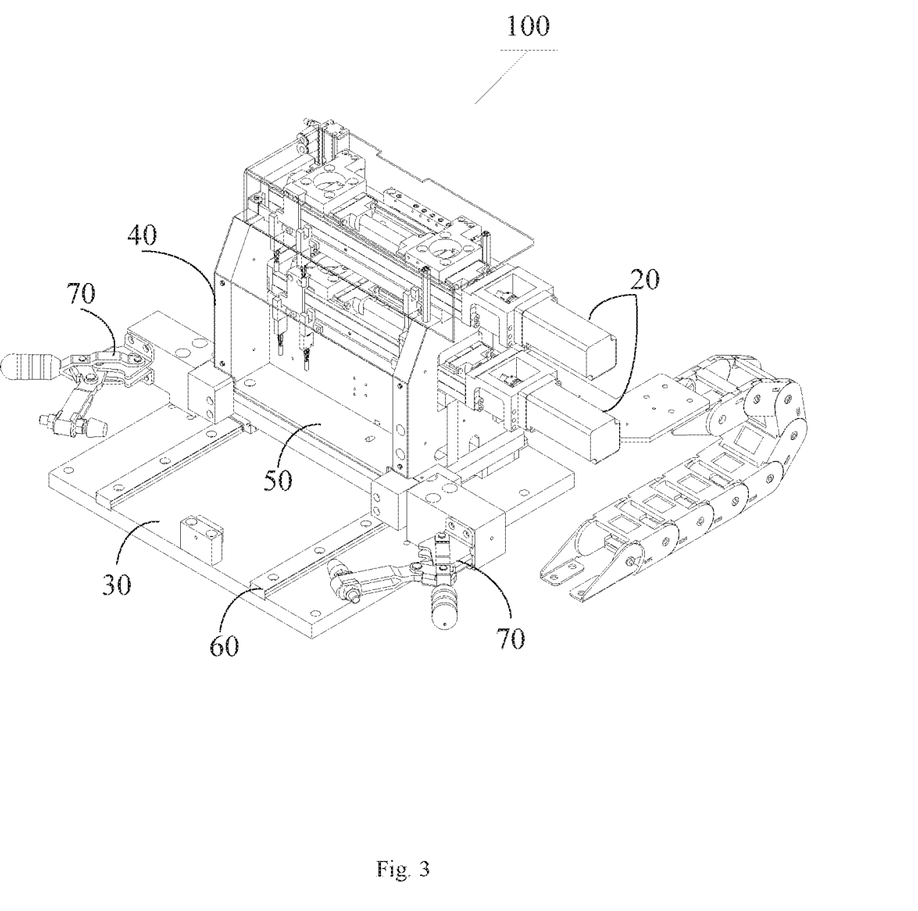
FIG. 3 is another perspective view of the device of FIG. 1.

A device 100 for transferring components according to an embodiment, as shown in FIGS. 1-3, comprises a base 30, a support 40, a transfer assembly 10, and a drive assembly 20. As shown in FIG. 1, a pair of supports 40 are provided on the base 30 and support the transfer assembly 10 and drive assembly 20.

The transfer assembly 10, as shown in FIG. 2, includes a transfer track 11 allowing a plurality of components 200 such as housings of connector assemblies to be transferred therein. The transfer track 11 has an operation position for operating the components 200.

The drive assembly 20, as shown in FIG. 2, includes a first drive mechanism 21 transferring a first set of components 200 at the operation position in the transfer track 11, and a second drive mechanism 22 transferring a second set of components 200 at the operation position in the transfer track 11. The first and second drive mechanisms 21, 22 in turn drive the first and second sets of components 200 to continuously transfer different components 200.

In the shown embodiment, two drive mechanisms 21, 22 are used to transfer in turn the components 200, so as to continuously transfer the components 200. Further, each of the first and second sets of components 200 may include at least one component 200. Each drive mechanism 21, 22 is adapted to transfer at least one component 200, such as one, two, three, or more, at every turn. A specific number of the transferred components 200 depends on a length of each component 200. A speed for transferring the components 200 may thereby be increased and thus production requirements may be met.

Figure 4:
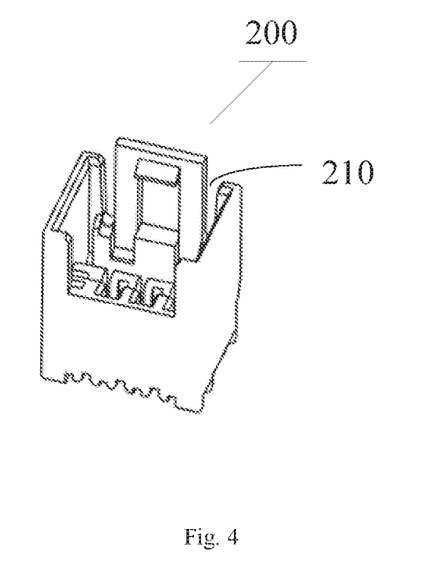
FIG. 4 is a perspective view of a component according to an embodiment.
Figure 5:
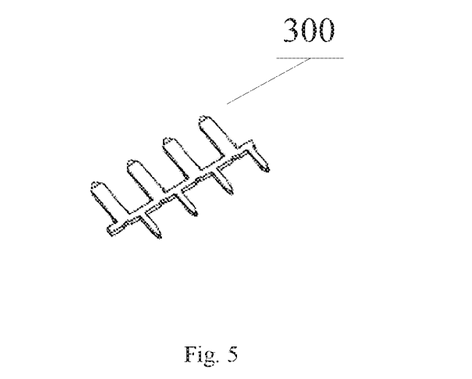
FIG. 5 is a perspective view of a mating component according to an embodiment.
Figure 6:
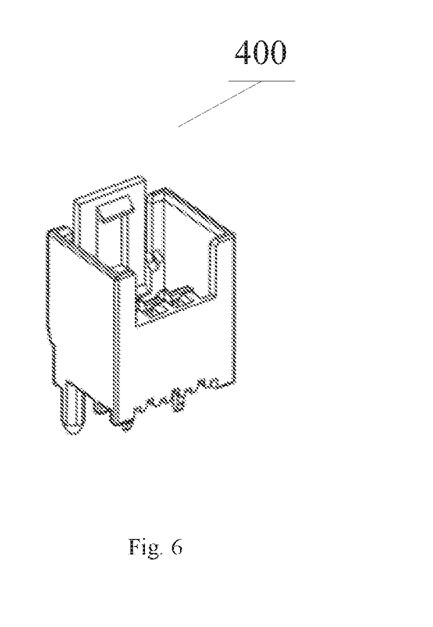
FIG. 6 is a perspective view of a connector assembly according to an embodiment.

As shown in FIG. 2, the transfer track 11 includes an inlet 111 and an outlet 112. The operation position of the transfer track 11 includes a feed position 113, located between the inlet 111 and the outlet 112 and closer to the inlet 111, and an inserting position 114 located between the feed position 113 and the outlet 112. A mating component 300 such as the terminal of the connector assembly is inserted into the component 200 at the inserting position 114 to form the connector assembly 400, as shown in FIGS. 4-6.

As shown in FIG. 2, the transfer assembly 10 includes a transfer table 12 in which the transfer track 11 is disposed. The transfer table 12 has an upper portion 121 and a lower portion 122. A recess is formed between the upper portion 121 and the lower portion 122, and the recess constitutes the transfer track 11.

As shown in FIG. 2, the transfer assembly 10 includes a first retaining member 13, for example, made of a resilient pad. The first retaining member 13 is disposed on the transfer table 12 adjacent to the feed position 113, and holds the components 200 entering the transfer track 11 from the inlet 111 at the feed position 113. In some exemplary embodiments, the transfer assembly 10 further includes a second retaining member 14, for example, made of a resilient pad. The second retaining member 14 is disposed on the transfer table 12 adjacent to the inserting position 14, and holds the component 200 stably when the mating component 300 is inserted into the component 200.

As shown in FIG. 2, the first drive mechanism 21 includes a first motor 211, a first drive table 213, and a first drive member 212. The first motor 211 includes a servo motor or a stepper motor. In an embodiment, the first motor 211 includes a servo motor, thereby ensuring good process control and precise positioning. The first drive table 213 is connected with the first motor 211.

As shown in FIG. 2, the first drive table 213 is disposed at the upper portion 121 of the transfer table 12. The first drive member 212 includes a first slide track 2121, a first slider 2122, and a first drive finger 2123. The first slide track 2121 includes a lead screw and is disposed on the first drive table 213. The first slider 2122 slides on the first slide track 2121 by a screw rod 2124 under an action of the first motor 211. A first end of the first drive finger 2123 is connected with the first slider 2122 and slides on the first slide track 2121 along with the first slider 2122. A second end of the first drive finger 2123 extends obliquely downward into the transfer track 11 and is inserted into a side portion 210 of the component 200, shown in FIG. 4, so as to transfer the component 200 in the transfer track 11.

The second drive mechanism 22, as shown in FIG. 2, includes a second motor 221, a second drive table 223, and a second drive member 222. The second motor 221 includes a servo motor or a stepper motor. In an embodiment, the second motor 221 includes a servo motor, thereby ensuring good process control and precise positioning. The second drive table 223 is connected with the second motor 221 and disposed at the lower portion 122 of the transfer table 12. The second drive member 222 includes a second slide track 2221, a second slider 2222, and a second drive finger. The second slide track 2221 includes a lead screw and is disposed on the second drive table 223. The second slider 2222 slides on the second slide track 2221 by a screw rod under an action of the second motor 221. A first end of the second drive finger is connected with the second slider 2222 and slides on the second slide track 2221 along with the second slider 2222. A second end of the second drive finger extends obliquely upward into the transfer track 11 and is inserted into a side portion 210 of the component 200 so as to transfer the component 200 in the transfer track 11.

In an embodiment, the transfer assembly 10 includes a first sensor disposed close to the feed position 113 for detecting whether the component 200 arrives at the feed position 113, a second sensor disposed close to the feed position 113 for detecting a specific position of the first or second drive finger arriving at the feed position 113, and a third sensor disposed close to the inserting position 114 for detecting a specific position of the first or second drive finger arriving at the inserting position 114, in order to precisely control the component transfer process.

As shown in FIGS. 1 and 3, a pair of third slide tracks 60 and a slide table 50 sliding on the third slide tracks 60 are provided on the base 30. The slide table 50 supports the support 40. With this arrangement, as the slide table 50 slides on the third slide tracks 60, the device 100 for transferring components may be adjusted to a proper position to cooperate with other work modules. As shown in FIG. 3, the device 100 for transferring components further includes a pair of lock mechanisms 70 on the base 30. The lock mechanisms 70 extend along a pair of sides of the slide table 50 parallel to the third slide track 60. The device 100 for transferring components may be fixed by utilizing the two lock mechanisms 70. When the device 100 for transferring components needs to be maintained, it is only necessary to release the lock mechanisms 70.

Figure 7:
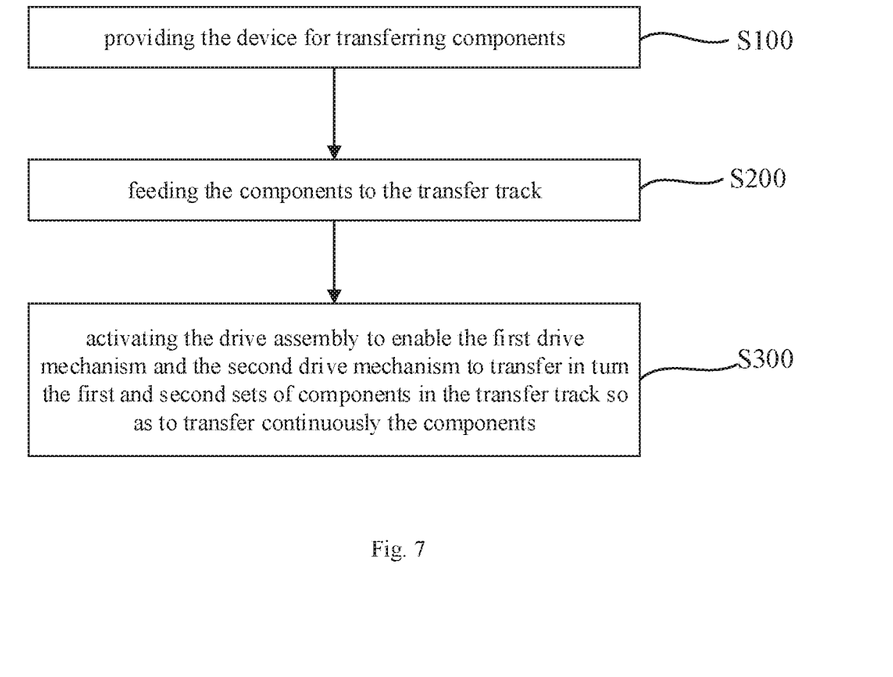
FIG. 7 is a flowchart of a method for transferring components using the device of FIG. 1.

A method for transferring components using the device 100, as shown in FIG. 7, includes the steps of:

S100: providing the device 100 for transferring components as described in any of the above-mentioned embodiments;

S200: feeding the components 200 to the transfer track 11; and

S300: activating the drive assembly 20 to enable the first drive mechanism 21 and the second drive mechanism 22 to transfer in turn the first and second sets of components 200 in the transfer track 11 so as to continuously transfer the components 200.

In some embodiments, in the step S200, the components 200 are automatically conveyed to the inlet 111 of the transfer track 11 by a conveyor or other devices, and the components 200 entering from the inlet 111 move by inertia to the feeding position 113, in which case the first retaining member 13 close to the feed position 113 will press the components 200 and hold them at the feed position 113.

In some embodiments, between the steps S200 and S300, the method further includes detecting whether the components 200 arrive at the feed position 113 by a first sensor of the transfer assembly 10 close to the feed position, improving the control precision.

In some exemplary embodiments, the step S300 includes:

S310: driving one of the first and second drive mechanisms 21, 22 to the operation position of the transfer track 11 and driving the other one of the first and second drive mechanisms 21, 22 to the outlet 112 of the transfer track 11;

S320: driving the first set of components 200 at the operation position by the one of the first and second drive mechanisms 21, 22, so as to transfer the first set of components 200 in the transfer track 11 from the operation position to the outlet 112 and to drive the first set of components 200 to exit out of the transfer track 11 from the outlet 112, and driving the other one of the first and second drive mechanisms 21, 22 to return to the operation position;

S330: driving the second set of components 200 at the operation position by the other one of the first and second drive mechanisms 21, 22, so as to transfer the second set of components 200 in the transfer track 11 from the operation position to the outlet 112 and to drive the second set of components 200 to exit out of the transfer track 11 from the outlet 112, and driving the one of the first and second drive mechanisms 21, 22 to return to the operation position;

S340: repeating the step S320.

In some embodiments, in the step S320 or S330, when the drive finger of one drive mechanism 21, 22 arrives at the feed position 113, the component 200 located at the feed position 113 presses downward the drive finger and arrives at the inlet 111 of the transfer track 11 along with the drive finger. The drive finger then travels from the inlet 111 to the feed position 113 under the action of the corresponding drive mechanism 21, 22, and the drive finger springs back and penetrates the side portion 210 of the component 200, so as to drive the component 200 reliably towards the outlet 112 of the transfer track 11. The drive finger transfers the component 200 to the inserting position under the action of the corresponding drive mechanism 21, 22, and the mating component 300 is inserted into the component 200 in the process of transferring the component 200 through the inserting position. Lastly, the drive finger drives the component 200 to exit out of the transport track 11 from the outlet 112 to go to the next station.

In some embodiments, the specific position of the drive finger may be detected by the second sensor close to the feed position 113 when the drive finger arrives at the feed position 113, thereby achieving accurate positioning. Similarly, the specific position of the drive finger may be detected by the third sensor close to the inserting position 114 when the drive finger arrives at the inserting position 114, thereby also achieving accurate positioning. In some embodiments, during the process of inserting the mating component 300 into the component 200, the component 200 may be pressed by the second retaining member 14 to avoid inaccurate positioning of the component 200 due to high speed and inertia.

Although the above descriptions have been made by taking the transferred component 200 as the housing of the connector assembly and the mating component 300 as the terminal, the present disclosure is not limited thereto. The transferred component 200 may include a portion of other assembly, such as a housing of a fiber optic connector; in another aspect, the mating component 300 may include a dust cap of the fiber optic connector.

The device 100 for transferring components in the above-described embodiment is a fully automatic device, and may be integrated into an automatic production line with little modification to improve efficiency. The device 100 for transferring components is also suitable for products with different pins as long as the length of the component 200 transferred at one time meets the requirements of the products.

It should be appreciated by those skilled in the art that the above embodiments are intended to be illustrative, modifications may be made to the above embodiments by those skilled in the art, and structures described in various embodiments may be freely combined without having structural and principle conflict. Thus the present disclosure may achieve more devices for transferring components and methods for transferring components on the basis of solving the problem to be solved by the present disclosure.

After describing in detail the embodiments of the present disclosure, it would be appreciated by those skilled in the art that various changes or modifications may be made in these embodiments without departing from the principles and spirit of the disclosure, the scope of which is not defined by the exemplary embodiments of the present disclosure, but defined in the claims and their equivalents.

What is claimed is:

1. A device for transferring components, comprising:
a transfer assembly including a transfer track transferring a plurality of components therein, the transfer track having an operation position for operating the components; and
a drive assembly including a first drive mechanism transferring a first set of components of the components at the operation position in the transfer track and a second drive mechanism transferring a second set of components of the components at the operation position in the transfer track, the first drive mechanism and the second drive mechanism in turn drive the first set of components and the second set of components, continuously transferring the components.

2. The device of claim 1, wherein the transfer track has an inlet and an outlet, the operation position has a feed position located between the inlet and the outlet and closer to the inlet.

3. The device of claim 2, wherein the transfer assembly includes a first retaining member disposed on the transfer track adjacent to the feed position and holding the components entering the transfer track from the inlet at the feed position.

4. The device of claim 3, wherein the transfer assembly includes a first sensor positioned close to the feed position and detecting whether the components arrive at the feed position.

5. The device of claim 3, wherein the operation position has an inserting position located between the feed position and the outlet, a plurality of mating components are inserted into the components at the inserting position.

6. The device of claim 5, wherein the transfer assembly includes a second retaining member disposed on the transfer track adjacent to the inserting position and holding the components when the mating components are inserted into the components.

7. The device of claim 5, wherein the transfer assembly includes a third sensor disposed close to the inserting position and detecting a specific position of the first drive mechanism or the second drive mechanism arriving at the inserting position.

8. The device of claim 2, wherein the transfer assembly includes a second sensor disposed close to the feed position and detecting a specific position of the first drive mechanism or the second drive mechanism arriving at the feed position.

9. The device of claim 1, wherein the first drive mechanism includes a first motor, a first drive table connected with the first motor, and a first drive member, the first drive member includes a first slide track disposed on the first drive table, a first slider sliding on the first slide track by a screw rod under an action of the first motor, and a first drive finger connected with the first slider, the first drive finger slides on the first slide track along with the first slider and is inserted into a side portion of one of the components to transfer the components in the transfer track.

10. The device of claim 9, wherein the first drive table is disposed above the transfer track, a first end of the first drive finger is connected with the first slider and a second end of the first drive finger extends obliquely downward into the transfer track.

11. The device of claim 1, wherein the second drive mechanism includes a second motor, a second drive table connected with the second motor, and a second drive member, the second drive member includes a second slide track disposed on the second drive table, a second slider sliding on the second slide track by a screw rod under an action of the second motor, and a second drive finger connected with the second slider, the second drive finger slides on the second slide track along with the second slider and is inserted into a side portion of one of the components to transfer the components in the transfer track.

12. The device of claim 11, wherein the second drive table is disposed below the transfer track, a first end of the second drive finger is connected with the second slider and a second end of the second drive finger extends obliquely upward into the transfer track.

13. The device of claim 1, wherein the transfer assembly has a transfer table in which the transfer track is disposed.

14. The device of claim 13, wherein the transfer table has an upper portion and a lower portion, the transfer track is formed by a recess between the upper portion and the lower portion.

15. A method for transferring components, comprising:
providing a device including a transfer assembly including a transfer track transferring a plurality of components therein, the transfer track having an operation position for operating the components, and a drive assembly including a first drive mechanism transferring a first set of components of the components at the operation position in the transfer track and a second drive mechanism transferring a second set of components of the components at the operation position in the transfer track, the transfer track has an inlet and an outlet, the operation position has a feed position located between the inlet and the outlet and closer to the inlet;
feeding the components to the transfer track; and
activating the drive assembly to enable the first drive mechanism and the second drive mechanism to transfer in turn the first set of components and the second set of components in the transfer track, continuously transferring the components.

16. The method of claim 15, wherein the activating step includes:
driving one of the first drive mechanism and the second drive mechanism to the operation position of the transfer track while driving the other of the first drive mechanism and the second drive mechanism to the outlet of the transfer track;
driving the first set of components at the operation position by the one of the first drive mechanism and the second drive mechanism to transfer the first set of components in the transfer track from the operation position to the outlet and to drive the first set of components to exit out of the transfer track from the outlet; and
driving the other one of the first drive mechanism and the second drive mechanism to return to the operation position.

17. The method of claim 16, wherein the activating step includes:
driving the second set of components at the operation position by the other one of the first drive mechanism and the second drive mechanism to transfer the second set of components in the transfer track from the operation position to the outlet and to drive the second set of components to exit out of the transfer track from the outlet; and
driving the one of the first drive mechanism and the second drive mechanism to return to the operation position.

18. The method of claim 17, further comprising detecting whether the components arrive at the feed position by a first sensor of the transfer assembly located close to the feed position.

19. The method of claim 18, wherein the feeding step includes holding the components entering the transfer track from the inlet at the feed position by a first retaining member of the transfer assembly.

20. The method of claim 19, wherein the operation position has an inserting position located between the feed position and the outlet, the activating step includes inserting a plurality of mating components into the components with the components held by a second retaining member of the transfer assembly located close to the inserting position when the components arrive at the inserting position of the transfer track.

* * * * *